(12) United States Patent
Deng et al.

(10) Patent No.: US 10,546,025 B2
(45) Date of Patent: Jan. 28, 2020

(54) USING HISTORICAL INFORMATION TO IMPROVE SEARCH ACROSS HETEROGENEOUS INDICES

(71) Applicant: International Business Machines Corporation, Armonk, NY (US)

(72) Inventors: Yu Deng, Hawthorne, NY (US); Murthy V. Devarakonda, Hawthorne, NY (US); Rafah A. Hosn, Yorktown Heights, NY (US); Nithya Rajamani, Hawthorne, NY (US); Norbert G. Vogl, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 777 days.

(21) Appl. No.: 14/672,860

(22) Filed: Mar. 30, 2015

(65) Prior Publication Data
US 2015/0205871 A1     Jul. 23, 2015

Related U.S. Application Data

(63) Continuation of application No. 12/535,330, filed on Aug. 4, 2009, now Pat. No. 8,996,561.

(51) Int. Cl.
*G06F 16/951* (2019.01)
*G06F 16/2452* (2019.01)
(Continued)

(52) U.S. Cl.
CPC .......... *G06F 16/951* (2019.01); *G06F 16/219* (2019.01); *G06F 16/24524* (2019.01); *G06F 16/9558* (2019.01); *G06F 16/9574* (2019.01)

(58) Field of Classification Search
None
See application file for complete search history.

(56) References Cited

U.S. PATENT DOCUMENTS 6,745,178 B1    6/2004  Emens et al.
7,603,349 B1 *  10/2009 Kraft ................. G06F 17/30867
(Continued)

OTHER PUBLICATIONS

John L. Scott, An Application of Semantic Search, Apr. 28 2009.*
Scott, "An Application of Sematic Search," Thesis, New York University, New York, Apr. 28, 2009.

*Primary Examiner* — James Trujillo
*Assistant Examiner* — John J Morris
(74) *Attorney, Agent, or Firm* — Scully, Scott Murphy & Presser, P.C.; Daniel Morris, Esq.

(57) ABSTRACT

A method, system and computer program product are disclosed for searching for data. In one embodiment, the invention provides a method comprising identifying a query and a search scope including a set of specified entities; and for each of these entities, estimating a number of documents that would be identified in a search through the entity to answer the query. On the basis of this estimating, a subset of the entities is formed. The query and this subset of entities are sent to a search engine to search the subset of entities to answer the query. In one embodiment, the estimating includes collecting statistical information from queries to build up a historical cache using heuristics or machine learning techniques, wherein the query includes a key word and a scope, and the historical cache contains a maximum number of returned results for an entity given the queries executed.

20 Claims, 7 Drawing Sheets

(51) Int. Cl.
*G06F 16/957* (2019.01)
*G06F 16/955* (2019.01)
*G06F 16/21* (2019.01)

(56) References Cited

U.S. PATENT DOCUMENTS

| | | |
|---|---|---|
| 8,024,337 B1 | 9/2011 | Baluja et al. |
| 8,538,970 B1 * | 9/2013 | Tucker ................ G06F 17/3053 707/748 |
| 2007/0156671 A1 * | 7/2007 | Yip ....................... G06F 16/285 |
| 2007/0156677 A1 * | 7/2007 | Szabo ............... G06F 17/30522 |
| 2009/0265338 A1 | 10/2009 | Kraft et al. |
| 2009/0287676 A1 | 11/2009 | Dasdan |
| 2009/0299965 A1 | 12/2009 | Aziz et al. |
| 2009/0299991 A1 * | 12/2009 | Zarzar Charur .... G06F 17/3064 |

\* cited by examiner

THE ALGORITHM OF AdaptiveMetaSearch

AdaptiveMetaSearch algorithm
Input: (l) a query Q;
    (2) a set D of entities (as scope);
    (3) H, cache about estimated number of documents for an entity w.r.t.Q; and
    (4) $T_1$, and $T_2$: thresholds.
Output: a list of ranked entities, and within each entity, a list of ranked documents.

```
1)     L= Pick Entities(D, H, T₁,):
2)     M←Φ
3)     DO
4)         Send query Q and the entities L to the component search engine:
5)         N←the first set of document links returned by the search engine;
6)         IF N is empty
7)             D←D-L;
8)         ELSE
9)             DO
10)                M←M ∪ {the entities covered by the document links in N};
11)                IF |L-M|≤T₂,
12)                    BREAK;
13)                ELSE
14)                    N ← Fetch the next set of document links returned by the search engine;
15)                    IF the entities from N are already in M
16)                        BREAK;
17)                    ENDIF
18)                ENDIF
19)            UNTIL TRUE
20)            D ← D-M;
21)        ENDIF
22)        IF D is empty
23)            BREAK;
24)        ELSE
25)            L = PickEntities(D, H, T₁);
26)        ENDIF
27)    UNTIL TRUE
28)    Rank the entities and their document links in M;
29)    Return M;
```

FIG. 5

PickEntities Algorithm
Input: (1) scope D: set of entities;
        (2) the cache H; and
        (3) threshold $T_1$.
Output: a list L of entities as the new sub-scope for the search 1)  $C \leftarrow$ entities in H, in ascending order with regard to the number of returned documents;
2)  $C \leftarrow C \cap D$;
3)  $L \leftarrow \Phi$;
4)  FOR each entity $d \in C$
5)      IF($H(d) + \sum_{d' \in L} H(d') \leq T_1$)
6)          $L \leftarrow L \cup \{d\}$;
7)      ELSE
8)          BREAK;
9)      ENDIF
10) ENDFOR
11) IF (($L = \Phi$) && ($C <> \Phi$))
12)     $L \leftarrow$ {first entity in C};
13) ENDIF
14) RETURN L;

FIG. 7

USING HISTORICAL INFORMATION TO IMPROVE SEARCH ACROSS HETEROGENEOUS INDICES

CROSS REFERENCE TO RELATED APPLICATION

This application is a continuation of copending application Ser. No. 12/535,330, filed Aug. 4, 2009, the entire content and disclosure of which is hereby incorporated herein by reference.

BACKGROUND OF THE INVENTION

Field of the Invention

The present invention generally relates to data processing, and more specifically, to searching for data or information in order to answer a query. Even more specifically, embodiments of the invention relate to methods, apparatus and computer program products that are well suited for retrieving information across heterogeneous indices.

Description of the Related Art

The Internet and the World Wide Web have become critical, integral parts of commercial operations, personal lives, and the education process. At the heart of the Internet is web browser technology and Internet server technology. An Internet server contains "content" such as documents, image or graphics files, forms, audio clips, etc., all of which is available to systems and browsers which have Internet connectivity. Web browser or "client" computers may request documents from web addresses, to which appropriate web servers respond by transmitting one or more web documents, image or graphics files, forms, audio clips, etc. The most common protocol for transmission of web documents and contents from servers to browsers is Hyper Text Transmission Protocol ("HTTP").

The most common type of Internet content or document is Hyper Text Markup Language ("HTML") documents, but other formats are also well known in the art, such as Adobe Portable Document Format ("PDF"). HTML, PDF and other web documents provide "hyperlinks" within the document, which allow a user to select another document or web site to view. Hyperlinks are specially marked text or areas in the document which when selected by the user, command the browser software to retrieve or fetch the indicated document or to access a new web site. Ordinarily, when the user selects a plain hyperlink, the current page being displayed in the web browser's graphical user interface ("GUI") window disappears and the newly received page is displayed. If the parent page is an index, for example the IBM web site www.patents.ibm.com, and the user wishes to visit each descending link (e.g. read the document with tips on how to use the site), then the parent or index page disappears and the new page is displayed (such as the help page).

As the computing capacity of web browser computers increases and the communications bandwidth to the web browser computer increases dramatically, one challenge for organizations that provide Internet web sites and content is to deliver and filter such content in anticipation of these greater processing and throughput speeds. This is particularly true in the realm of web-based applications, and in the development of better and more efficient ways to move user-pertinent information to the desktop or client. However, today's web browsers are in general unintelligent software packages. As these browsers currently exist, they require the user to manually search for any articles or documents of interest to him or her, and these browsers are often cumbersome in that they frequently require a download of many documents before one of germane interest is found.

Search engines provide some level of "intelligence" to the browsing experience, wherein a user may point his unintelligent web browser to a search engine address, enter some keywords for a search, and then review each of the returned documents one at a time by selecting hyperlinks in the search results, or by re-pointing the web browser manually to provided web addresses. However, search engines do not really search the entire Internet, rather they search their own indices of Internet content which has been built by the search engine operator, usually through a process of reviewing manual submissions from other web site operators. Thus, it is common for a user to use several search engines while looking for information on a particular subject, because each search engine will return different results based on its own index content.

To address this problem, another technology has been developed and is known in the art as "MetaSearch engine". A MetaSearch engine does not keep its own index, but rather submits a query to multiple search engines simultaneously, and returns to the user the highest ranked returns from each of these search engines. The MetaSearch engine may, though, return the top 5 listings from 4 search engines, which may filter out the more likely interesting information.

MetaSearch engines are constructed to support unified access to multiple search engines. With reference to FIG. 1, when merging results from multiple search indices 20, 22, a MetaSearch engine 24 can adopt either local similarity adjustment or global similarity estimation to provide documents 26. In the local adjustment approach, each component search engine ranks documents locally. Then the MetaSearch engine normalizes the ranks into the same range with additional information such as the quality of component search engines. For global similarity estimation, the MetaSearch engine computes a global similarity score for each returned document with certain information from component engines, such as the local document frequency of a term. Today a number of MetaSearch engines have been constructed and are available on the internet such as MetaCrawler and Dogpile. The component search engines in these systems deal with the same type of data, the document level indices. Documents in these systems as shown in FIG. 1 are first class entities. The term "first class entities" refers to the entities that can be used in programs without restrictions. Here, it refers to the abstract objects (such as books and departments) used in the system designed.

IBM's Enterprise Information Leverage (EIL) system can be regarded as a MetaSearch engine which provides unified access to services engagement data. A service engagement represents the interaction as well as the documents exchanged between sellers and clients. With reference to FIG. 2, an EIL system 30 combines information extraction and semantic search to support information needs of a user. An EIL system leverages structured and unstructured data using novel architecture and special purpose algorithms. Information is organized around an entity (such as engagements, books and departments), and the system supports a semantic concept index based information retrieval 32 by utilizing both information of first class entities in database queries 34 and of document index search 36 where the relevant entities act as a contextual constraint 38. In EIL systems, there is a need to deal with heterogeneous search indices; these indices are associated with documents as well as semantic concepts extracted from these documents. These concepts represent important properties of a service engagement. Analogously, a system can include data about books and each page in a book, or about departments in a company and each person in the department, etc. Furthermore, the indices can be stored in different places. For example, data about books can be stored in relational databases such as DB2, and information about pages in the books can be stored in a search engine such as OmniFind. The semantical differences between heterogeneous search indices may be a problem when merging and ranking the results in a MetaSearch engine.

Furthermore, in systems similar to the EIL system, documents are not first class entities. These entities can be engagements, books, departments, and so on. For instance, a user may want to search for a book about Java programming. If a page of content in a book mentions Java programming, the book should be returned. The ideal result is that a number of books are returned that relate to Java programming where, under each book, the top ranked pages containing the keywords are listed with hit highlights. Based on the hit highlights and the properties of books, a user can decide if a book is of interest. Therefore, it is important to cover as many books as possible given a certain number of book pages.

For example, two search indices for 5000 books have been established. One index is a keyword search index that is stored in a keyword search engine. The other index has specific properties of each book, such as the book titles, authors' names, dates published, abstracts, readers' comments, and so on. Normally, only a limited number of documents can be retrieved from a keyword search engine. For example, by default, OmniFind returns 500 document links for each search call. However, for a search of the term "Java programming", a return of 500 pages from the same book is not the best result. An ideal result would be to have about 10 to 20 pages returned for a single book to allow the system to rank the books based on both the pages that are returned and the properties (semantic concepts) indexed in a relational database. In this way, there are a sufficient number of books presented for the user without retrieving too many pages. In a regular web search engine, documents are stored as first class entities and there is no need to group documents into a higher level of entities. What is needed is a system and search engine processing methodology that presents a sufficient number of books to a user for review without retrieving an excessively large number of pages.

SUMMARY OF THE INVENTION

This invention is directed to a system and method for improving the recall of search results and minimizing search cost without significantly affecting the precision of the search, while considering several constraints (for example, the limitation of query length in certain search engines). Embodiments of the invention provide a method, system and computer program product for searching for data. In one embodiment, the invention provides a method comprising identifying a query and a search scope including a set of specified entities; and for each of said specified entities, estimating a number of documents that would be identified in a search through said each entity to answer said query. On the basis of this estimating, a subset of the entities is formed, and the query and this subset of entities are sent to a search engine to search said subset of entities to answer said query.

In another embodiment, the invention provides a system for searching for data. This system comprises one or more processing units configured for receiving a query and a search scope including a set of specified entities; and for each of said specified entities, estimating a number of documents that would be identified in a search through said each entity to answer said query. On the basis of this estimating, a subset of the entities is formed, and the query and this subset of entities are sent to a search engine to search said subset of entities to answer said query.

In another embodiment, the invention provides a computer program product, readable by a computer, and, when executed on the computer, the computer program product receives a query and a search scope including a set of specified entities; and for each of said specified entities, estimates a number of documents that would be identified in a search through said each entity to answer said query. On the basis of this estimating, a subset of the entities is formed, and the query and this subset of entities are sent to a search engine to search said subset of entities to answer said query.

In one embodiment, the estimating includes collecting statistical information from queries to build up a historical cache using heuristics or machine learning techniques; wherein said query includes a key word and a scope, and said historical cache contains a maximum number of returned results for an entity given the queries executed. In this embodiment, the forming includes rewriting said query based on the historical cache; and the search engine executes the query to get a group of entities, each having a group of documents, and the historical cache is updated with the rewritten query results. Also, for example, the subset of entities may be formed so that the total of the estimated number of documents for all of the entities in the subset is not more than a given number.

BRIEF DESCRIPTION OF THE DRAWINGS

Other aspects, features, and advantages of the present invention will become more fully apparent from the following detailed description, the appended claims, and the accompanying drawings in which similar elements are given similar reference numerals.

FIG. 5 shows an adaptive MetaSearch algorithm that may be used in the present invention;

FIG. 7 shows an algorithm that may be used to implement the method outlined in FIG. 6.

DESCRIPTION OF THE PREFERRED EMBODIMENT

Figure 1:
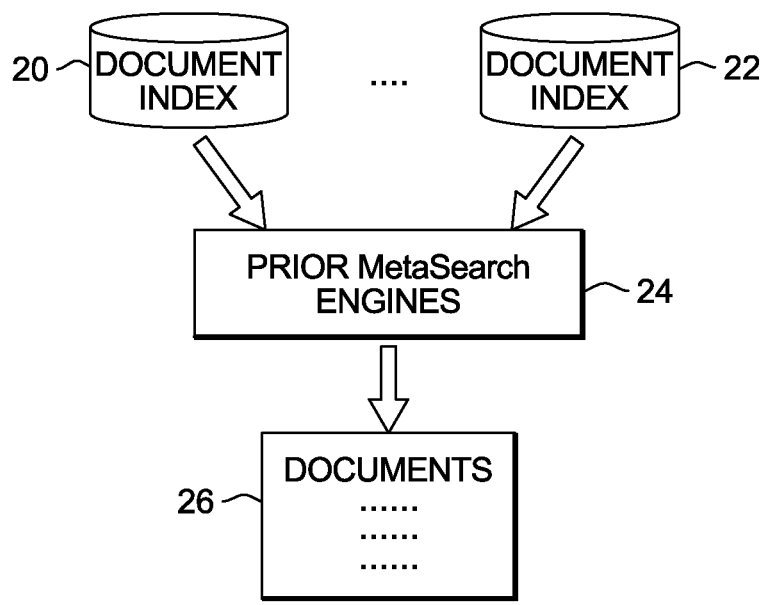
FIG. 1 is a block diagram of a prior art meta search engine.
Figure 2:
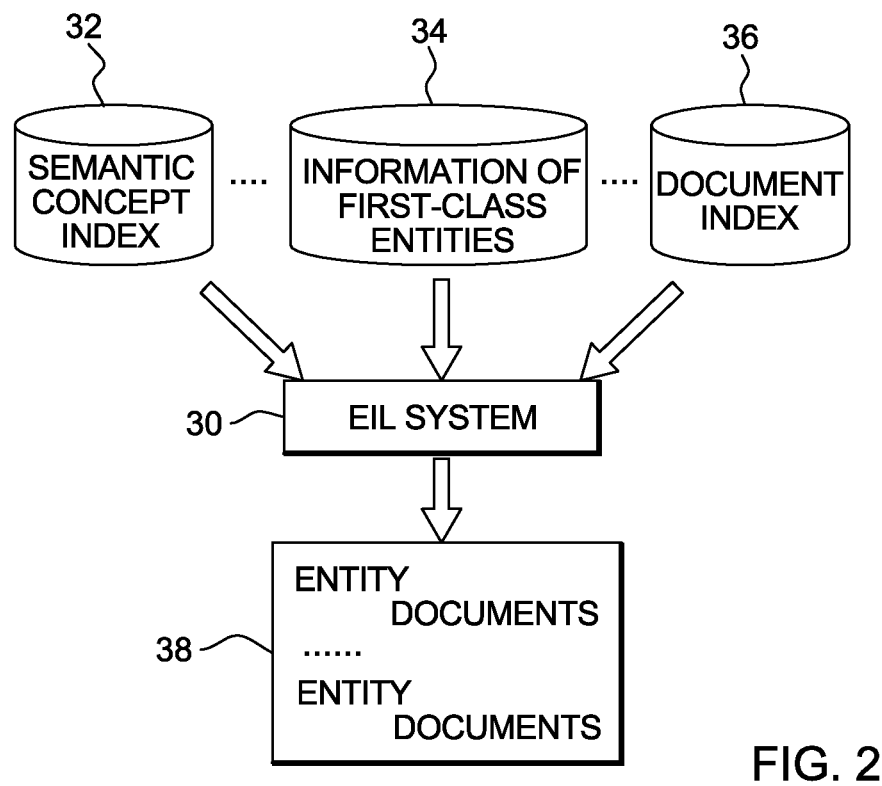
FIG. 2 is a block diagram to illustrate the EIL search system.
Figure 3:
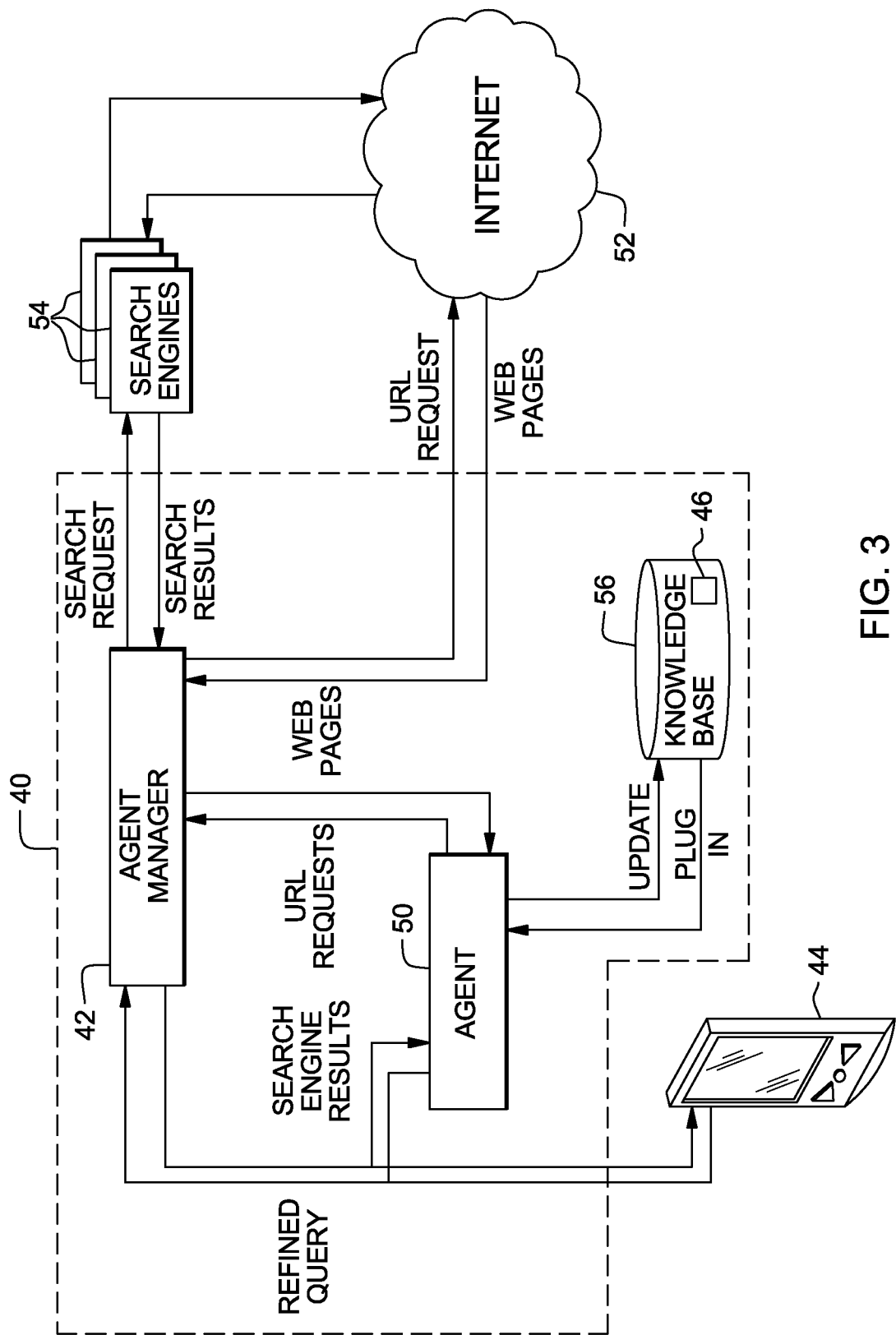
FIG. 3 is a block diagram showing functional details of a system embodying this invention.

FIG. 3 shows a block diagram of a search engine system including functional elements and interactions within a web server 40 in accordance with one embodiment of the present invention. An agent manager 42 running on server 40 receives domain-specific queries from a user, typically from an input from device 44 such as a mobile device. The user chooses, in one embodiment, one of a number of historical caches 46 that are available on server 40 (or which are imported to the server from other sources), depending on the particular domain of the query. Additionally or alternatively, the user may identify sites or Web pages on the sites that contain information relevant to a query, typically by inputting sample Uniform Resource Locators (URLs) to an agent.

Mobile device 44 sends user query to the agent manager 42, the manager sends the query to the agent 50, and then the agent sends refined queries back to the manager 42. Subsequently, the manager 42 sends the refined queries to the search engines 54, the search engines return the results back to the manager, and then the manager sends the search engine results to the agent 50. The agent correlates the results, sorts them at the entity level and sends the results back to the manager 42. Then the manager sends the sorted results back to the mobile device 44.

The knowledge base 56 contains the historical cache, which has the statistical information collected from query results and/or component search engines. The knowledge base 56 may also contain the domain specific vocabulary, which is a repository of terms that appear in the high-ranking sites of the domain. Each term is preferably associated with a list of lexical affinities, other closely related terms that are frequently found in proximity to that term. Methods for finding lexical affinities in a corpus of documents are known in the art. For example, for any given word in a sentence, all other words that are within the sentence and no more than five words away from the given word can be considered as its lexical affinities.

For each domain, knowledge base 56 can have the form of a file or set of files. Thus, to import or export any knowledge base from one server 40 to another, and/or from one user to another, it is sufficient to copy the appropriate knowledge base files. Thereafter, the user receiving the knowledge base can personalize the associated knowledge agent by carrying out further focused searches in his or her specific domain. As the user performs more and more such searches, the knowledge agent will become increasingly specialized in the particular domain of interest to the user.

This invention is directed toward minimizing the search cost and improving the recall of search results without significantly affecting the precision of the search, while considering several constraints which are typical in a MetaSearch system. For example, one constraint might be that each component search engine has specific query limitations. For example, with OmniFind, one of the component search engines in the system cannot accept queries that contain too many terms. In addition, it is limited to return at most 500 document links for each search call.

A second constraint can be that the number of calls to each component search engine should be reduced to minimize the cost of a search. A third constraint can relate to privacy and security concerns. Typically, in an enterprise search engine, a user is authorized to have access to only certain kinds of data based his or her job roles. For example, a security policy may indicate that users can only access the documents in those services engagements that they have worked on.

Specifically, in the IBM EIL system, where security policy is an issue, each user may have access to a portion of the engagement data that is defined as the search scope. The goal is to return as many engagements (entities) as possible in the scope while minimizing the number of calls to component search engines. In addition, all of the returned engagements (entities) should be relevant to the query because some documents in the engagements contain the query terms. For example, for each engagement (entity) "d" in the scope, the agent rewrites the search query to use "d" as a new scope, and the query is then sent to a component search engine such as, for example, OmniFind. This method guarantees coverage for each engagement in the scope. However, sending the query to a component search engine for each engagement will result in a slow run time for the search.

With a different approach, multiple engagements (entities) are randomly grouped together as new scopes, and the user or agent re-writes the search query for each of the new scopes prior to sending the queries to component search engines. This approach will reduce the number of calls to component search engines, but it cannot guarantee coverage of all of the engagements (entities) that are to be searched. This is because some engagements may return a large number of document links for the query where the document links occupy the limited slots for the returned links from a component engine such as OmniFind.

Using the book example discussed above, suppose a user is looking for books about "Java programming" which were published in 2000. Including "2000" in the keyword search will not help because a book may include the term "2000" in the content, which is not its published date. Therefore, the term "2000" is searched in the database containing book properties, and the result is combined with the returned document links. Using four books as an example, it is assumed that books 1 and 3 were published in 1999, book 2 was published in 2000, and book 4 was published in 2003. Suppose OmniFind is used as a component search engine and returns only 500 document links for a search call. Furthermore, assume that book 1 has 300 pages that are to be returned, book 2 has 50 pages that are to be returned, book 3 has 200 pages that are to be returned, and book 4 has 100 pages that are to be returned. Normally, OmniFind will return documents in the order of relevance. If books 1, 2 and 3 are grouped together as a first scope, and book 4 as a second scope, it is likely that the query for the first scope only will return documents from books 1 and 3 as the 500 page limit will be reached. Therefore, book 2 which may be a good match, will be missed in the results. If, however, books 2, 3 and 4 are grouped together because it is known that the total number of returned documents, the number of pages, is less than 500, then book 2 will not be removed from the results.

Figure 4:
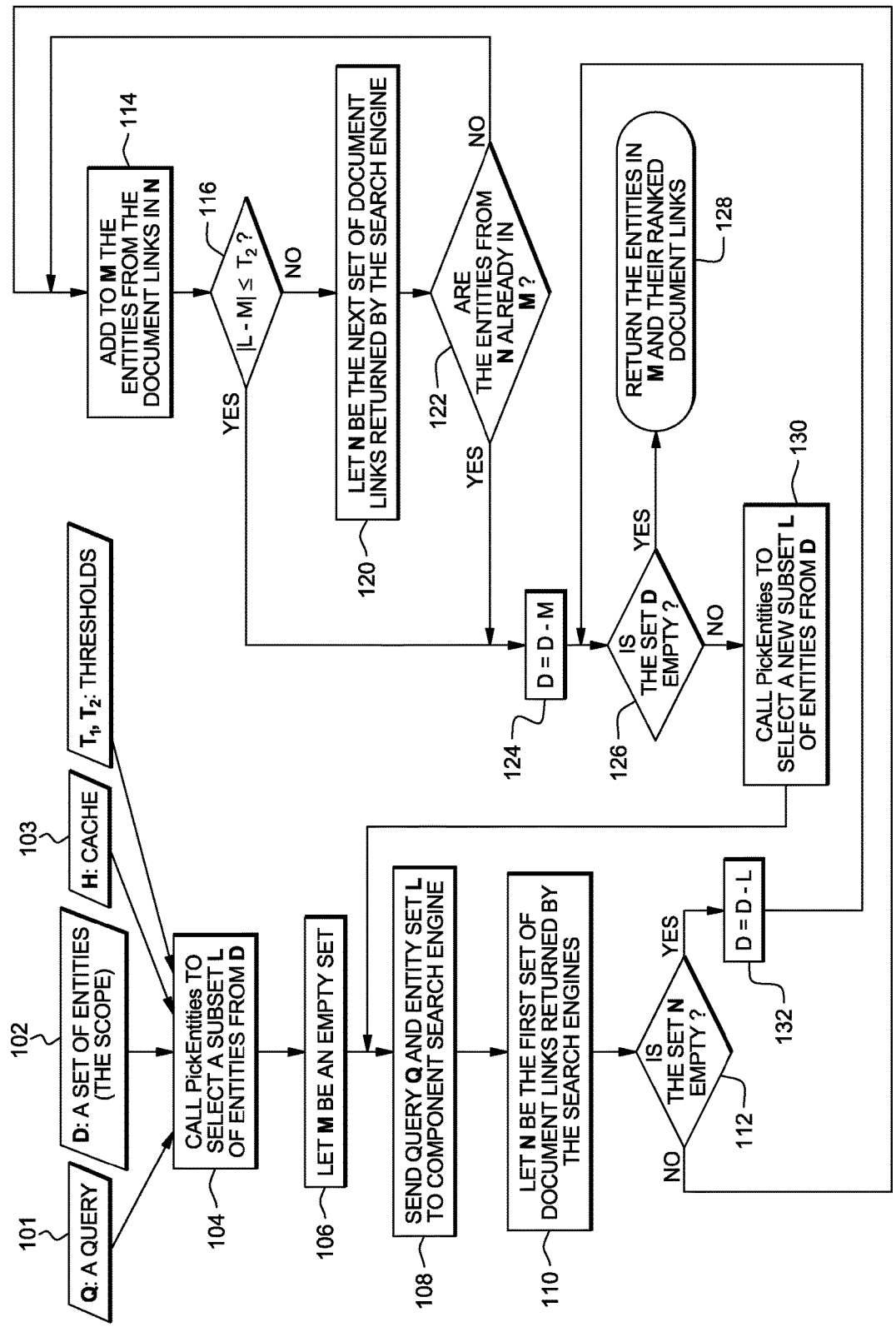
FIG. 4 is a flow chart of a method for performing a MetaSearch in accordance with the principles of the invention.

We use the above example to illustrate the steps in the algorithms AdaptiveMetaSearch and PickEntities as follows. FIG. 4 is a flow chart 100 of a MetaSearch in accordance with the principles of the invention (the algorithm AdaptiveMetaSearch). The flow chart includes symbols and data structures defined as follows:

Cache H represents a data structure for recording the collected statistical information. Here we use it to record the maximum number of returned documents for an entity, such as an engagement or a book, given all of the user queries submitted, i.e., $H(d)=MAX(H(d), q(d))$, where d is an entity, such as an engagement or a book; q(d) is the returned number of documents of d from the results of the most recent query q; MAX(para1, para2) is a function that compares para1 and para2, and returns the bigger one as the result; H(d) represents the maximum number of returned documents for d collected so far and its initial value could be zero. The cache H can also be constructed by using other heuristics or machine learning techniques. In the book example, the cache H gives the estimation of how many pages each book might return given a query. The cache H can be used to determine which entities should be grouped together and sent to a component search engine before the other entities in a search scope. In addition, it is assumed that the cache is always ranked in ascending order.

Threshold $T_1$: the total number of returned documents for entities in a group should be no more than $T_1$, and $T_1$ shall have a value that is no less than the maximum number of documents a component search engine returns for a query. In the book example, $T_1$ can be set to 500. Threshold $T_2$: if the number of different entities between the set of entities to be covered by a query and the set of returned entities of the query is smaller than $T_2$, then there is no need to get the next set of document links from the search engine. In the book example, this can be set to 1. The entities that have not been covered by the search results can be combined with entities in the next scope and sent to the search engine as a new query.

The input of algorithm AdaptiveMetaSearch includes a query Q 101, which comprises terms to be searched, such as "Java Programming"; D 102, a set of entities as a scope, such as book 1, book 2, book 3 and book 4; H 103, the cache, which has a cache value representing an estimated number of documents for an entity with respect to Q, and two thresholds $T_1$ and $T_2$. The output is a list of returned entities, and within each entity, a list of obtained ranked documents.

FIG. 4 is a flow chart of the algorithm AdaptiveMetaSearch, and FIG. 5 shows pseudo-code for this algorithm. As shown in FIGS. 4 and 5, the algorithm AdaptiveMetaSearch first calls the function "PickEntities," as discussed below, to select a subset L of entities from the scope D, step 104. Then the algorithm initializes M to be an empty set, step 106, and sends the query Q and entity set L to a component search engine, step 108. The first set of document links returned by the search engine is designated as N, step 110, and at step 112, a check is made to determine if the set N is empty. If N is not empty, the routine proceeds to step 114, where entities from the document links in N are added to M. At this time, at step 116, the cardinality of the difference between L and M is compared to $T_2$. If this cardinality of difference is not less than or equal to $T_2$, then at step 120, N becomes the next set of document links returned by the search engine. At step 122, N is compared to M to determine if the entities from N are already in M. If not, the process returns to step 114; however, if the entities from N are already in M, then, at step 124, M is subtracted from D (notice that the entities in L but not in M are still in D and will be picked up in subsequent scopes). Also, if at step 116 the cardinality of difference between L and M is less than or equal to $T_2$, then the routine proceeds from step 116 to step 124, where M is subtracted from D.

After step 124, a check is made at step 126 to determine if the set D is empty. If D is empty, then at step 128, the entities in M and their ranked document links are returned. If at step 126, D is not empty, then the routine moves on to step 130, and another call to PickEntities method is performed to select a new subset L of entities from D. From step 130, the routine returns to step 108. The algorithm of FIG. 4 also proceeds to step 126 from step 112 if, at step 112, N is empty. In particular, if at step 112, N is empty, then L is subtracted from D at step 132, and the routine then goes to step 126.

In the book example, the function PickEntities first returns book 2, book 4 and book 3 as a sub-scope. Then this sub-scope together with the query are sent to the component search engine. Then based on the returned documents, book 2, book 3 and book 4 are added into M. Then the scope D is updated such that only book 1 is left. The second call of PickEntities returns book 1 as the sub-scope and book 1 is added into M. Then D becomes empty and the search process stops. Eventually M contains the four books and the corresponding document links (returned pages).

Figure 6:
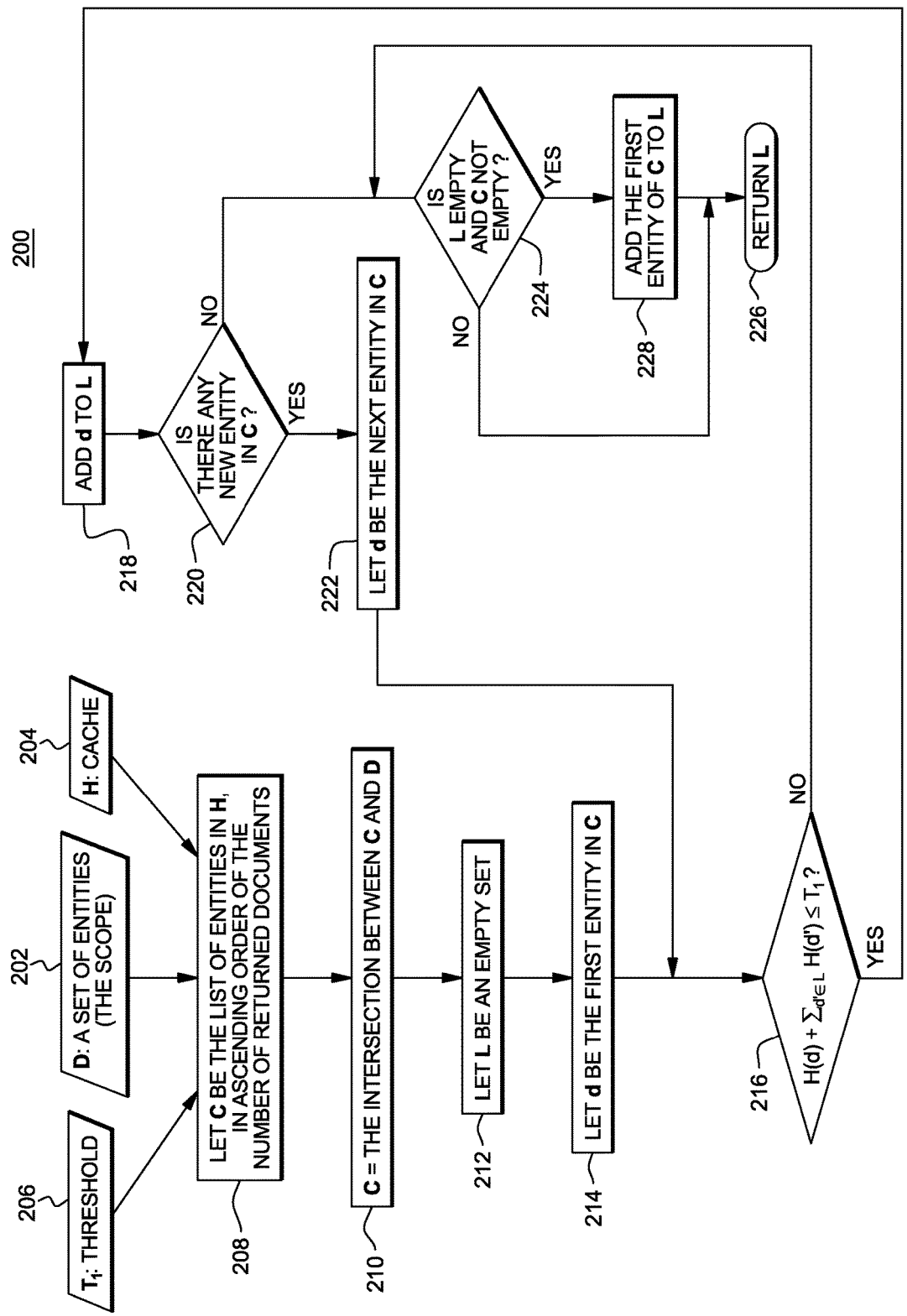
FIG. 6 is a flow chart of a method for performing PickEntities in accordance with the principles of the invention.

FIG. 6 shows a flow chart 200 that illustrates the PickEntities method in accordance with the principles of the invention and FIG. 7 shows pseudo-code for the algorithm. In this embodiment, the method uses inputs D, a set of entities (the scope) 202, cache H 204, and threshold $T_1$ 206. For example, given the four books discussed above and the estimation from the cache H, the function PickEntities may return book 2, book 4 and book 3 as a sub-scope. At step 208, let C be the list of entities in H, in ascending order of the estimated number of returned documents. Then C is updated to comprise the intersection between C and D, step 210, so that only the entities in the scope D are considered in later steps. In addition, the variable L is set to be an empty set, step 212, and d is set to be the first entity in C, step 214. For each entity d, a determination is made at step 216 as to whether the relationship $H(d)+\Sigma_{d'\in L}H(d')\leq T_1$ is satisfied, i.e., if the number (H(d)) of returned documents of d plus the total number ($\Sigma_{d'\in L}H(d')$) of returned documents of the existing entities in set L is equal to or less than $T_1$.

If, at step 216, this sum is less than $T_1$, then d is added to set L, step 218. At step 220, it is determined if there is any new entity in C which has not been considered. If the answer is YES, d becomes the next entity in C, step 222, and the process goes back to step 216. If however, it is determined, at step 220, that there is no new entity in C, then it is determined, at step 224, if L is empty and C is not empty. If the answer is no, then L is returned, step 226. If, however, the answer is yes at step 224, then the first entity of C is added to L, step 228. Returning to step 216, if the relationship in step 216 is not satisfied, then the process proceeds to step 224 where it is determined if L is empty and C is not empty.

In the above-discussed book example, suppose the scope D is books 1, 2, 3 and 4; and suppose H estimates book 1 has 300 pages to be returned, book 2 has 50 pages, book 3 has 200 pages and book 4 has 100 pages. Then C has book 2, then book 4, then book 3, then book 1 in the ascending order of the estimated returned numbers. The set L acquires book 2, book 4 and book 3 with a total number 350 of returned pages (documents). Then, when book 1 comes, the check in step 216 will fail, because 350 plus 300 equals 650, which is larger than 500, the threshold $T_1$. Therefore, the first call of PickEntities returns book 2, book 4 and book 3 as a sub-scope.

Figure 8:
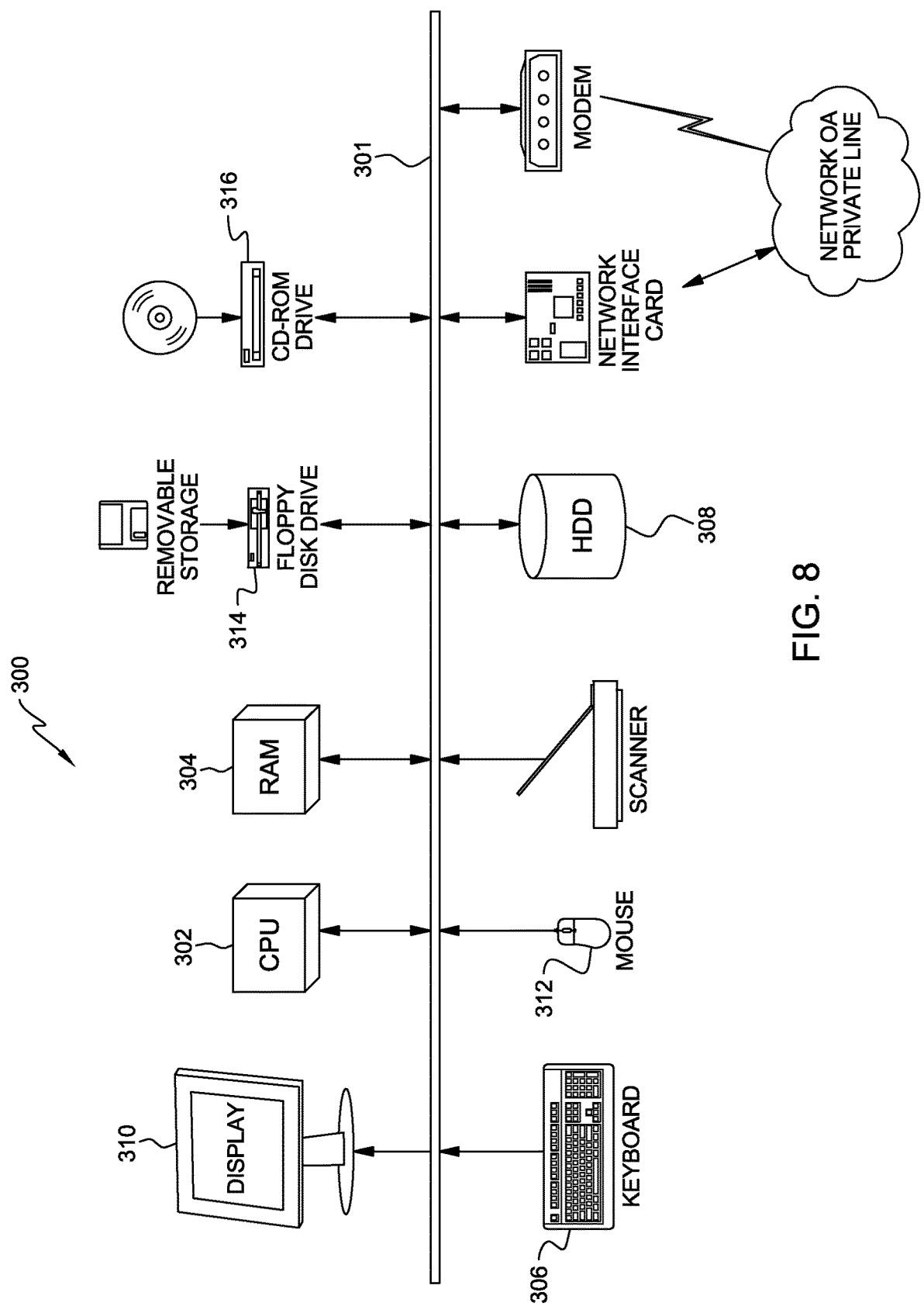
FIG. 8 is a block diagram of a computer system for use with the present invention.

The present invention can be used on any properly configured general purpose computer system, such as the system shown in FIG. 8. Such a computer system 300 includes a processing unit (CPU) 302 connected by a bus 301 to a random access memory 304, a high density storage device 308, a keyboard 306, a display 310 and a mouse 312. In addition, there is a floppy disk drive 314 and a CD-ROM drive 316 for entry of data and software, including software embodying the present invention, into the system on removable storage. An example of such a computer is an IBM Personal computer of the International Business Machines Corporation, such as an Aptiva personal computer operating on Microsoft Windows operating system of the Microsoft Corporation. Also in this example there is an internet browser capable at running Java such as Netscape Navigator of the Netscape Communications Corporation or Internet Explorer of the Microsoft Corporation.

The various method embodiments of the invention will be generally implemented by a computer executing a sequence of program instructions for carrying out the steps of the method, assuming all required data for processing is accessible to the computer. The sequence of program instructions may be embodied in a computer program product comprising media storing the program instructions. As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the method, and variations on the method as described herein. Alternatively, a specific computer, containing specialized hardware for carrying out one or more of the functional tasks of the invention, could be utilized.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM) or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave, The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider).

The present invention is described above with reference to flow chart illustrations and/or block diagrams of methods, apparatus (systems) and computer program products according to embodiments of the invention. It will be understood that each block of the flow chart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instructions means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although an example of the present invention has been shown and described, it would be appreciated by those skilled in the art that changes might be made in the embodiment without departing from the principles and spirit of the invention, the scope of which is defined in the claims and their equivalents.

What is claimed is:

1. A computer-implemented method of searching for documents in response to a user query, the method comprising:
    receiving, at a computer processor system, a query from a user;
    identifying, at the computer processor system, a search scope for the query, the search scope including a set of entities, each of the entities including one or more documents;
    forming, at the computer processor system, a subset of said entities based on defined criteria wherein the subset of said entities includes a number of the entities of said set of entities; and
    sending said query and said subset of said entities to a search engine to search said subset of said entities;
    the search engine searching through said subset of said entities to identify a first group of documents from said subset of said entities, said group of documents linking to a number of the entities in said subset of the entities;
    adding the linked entities to a linked entities set, wherein the linked entities set includes a number of the entities of the subset of said entities;
    comparing the number of the entities in the linked entities set to the number of the entities in said subset of said entities; and
    when the difference between the number of the entities in the linked entities set and the number of the entities in said subset of said entities is less than a defined, linked entities threshold value, adding one of the entities in the set of entities to the subset of the entities; and repeating the searching, adding, comparing, and adding one of the entities in the set of entities to the subset of the entities until the difference between the number of the entities in the linked entities set and the number of the entities in said subset of said entities is not less than the defined, linked entities threshold value.

2. The method according to claim 1, further comprising:
    when said number of the linked entities is more than the defined value, forming another subset of the entities and sending said query and said another subset of the entities to the search engine to search said another subset of said entities for further documents.

3. The method according to claim 2, further comprising:
    for each of said specified entities, estimating a number of the documents included in said each entity that would be identified in a search through said each entity to answer said query; and
    the forming a subset of said entities includes forming the subset of said entities based on the estimated number of the documents included in said each entity that would be identified in a search through said each entity to answer said query.

4. The method according to claim 3, wherein:
    said estimating a number of the documents includes storing in a historical cache results from previous searches through each of the entities, including for each of the entities, storing in the historical cache a number that is the largest number of the documents identified in the each entity during any of the previous searches through the each entity.

5. The method according to claim 4, wherein the forming a subset of said includes forming the subset of said entities based on said numbers stored in the historical cache.

6. The method according to claim 5, wherein the forming the subset of said entities based on said numbers stored in the historical cache includes using said number, from the historical cache, that is the largest number of the documents identified in the each entity during the any of the previous searches through the each entity, as an estimated number of return documents for included in said each entity.

7. The method according to claim 1, wherein the total of the estimated number of documents for all of the entities in the subset of entities is not more than a given number.

8. The method according to claim 7, wherein the forming the subset of said entities further includes:
    arranging the entities in a defined order; and
    forming the subset of the entities based on said defined order.

9. The method according to claim 8, further comprising:
    storing in a historical cache results from previous searches through each of the entities, including for each of the entities, storing in the historical cache a number that is the largest number of the documents identified in the each entity during any of the previous searches through the each entity; and wherein:
    the arranging includes arranging the entities in order based on said number, from the historical cache, that is the largest number of the documents identified in each of the specified entities during any of the previous searches through the each entity; and
    the forming a subset of said entities includes adding a defined number of the entities to the subset of entities, in ascending order of said number, from the historical cache, that is the largest number of the documents identified in each of the specified entities during any of the previous searches through the each entity.

10. The method according to claim 9, wherein:
    the total of the estimated number of documents that would be returned for the entries in the subset is less than a given number;
    the identifying a query includes using a mobile device to transmit the query, and using a server to receive the query, and using a server to receive the query from the mobile device;
    the sending the query includes operating an agent manager on the server to send the query to the search engine; and
    the method further comprises:
    the search engine returning results of the searching to the agent manager;
    the agent manager sending the results to an agent operating on the server;
    using the agent to correlate the results, sort the results and send the sorted results back to the agent manager; and
    the agent manager sending the sorted results to the mobile device.

11. A computer system for searching for documents in response to a user query, comprising:
    a memory for storing data; and
    one or more processing units connected to the memory for sending data to and receiving data from the memory, said one or more processing units configured for:
    receiving, at a computer processor system, a query from a user;
    receiving a search scope for the query, the search scope including a set of entities, each of the entities including one or more documents;
    forming a subset of said entities based on defined criteria, wherein the subset of said entities includes a number of the entities of said set of entities;

sending said query and said subset of said entities to a search engine to search said subset of said entities;

the search engine searching through said subset of said entities to identify a first group of documents from said subset of said entities, said first group of documents linking to a number of the entities in said subset of the entities;

adding the linked entities to a linked entities set, wherein the linked entities set includes a number of the entities of the subset of said entities;

comparing the number of the entities in the linked entities set to the number of the entities in said subset of said entities; and when the difference between the number of the entities in the linked entities set and the number of the entities in said subset of said entities is less than a defined, linked entities threshold value, adding one or the entities in the set of entities to the subset of the entities; and repeating the searching, adding, comparing, and adding one of the entities in the set of entities to the subset of the entities until the difference between the number of the entities in the linked entities set and the number of the entities in said subset of said entities is not less than the defined, linked entities threshold value.

12. The system according to claim 11, wherein said one or more processing units are further configured for:

when said number of the linked entities is more than the defined value, forming another subset of the entities and sending said query and said another subset of the entities to the search engine to search said another subset of said entities for further documents.

13. The system according to claim 12, wherein said one or more processing units are further configured for:

for each of said specified entities, estimating a number of the documents included in said each entity that would be identified in a search through said each entity to answer said query; and the forming a subset of said entities includes forming the subset of said entities based on the estimated number of the documents included in said each entity that would be identified in a search through said each entity to answer said query.

14. The method according to claim 13, wherein:

said estimating a number of the documents includes storing in a historical cache results from previous searches through each of the entities, including for each of the entities, storing in the historical cache a number that is the largest number of the documents identified in the each entity during any of the previous searches through the each entity.

15. The method according to claim 14, wherein the forming a subset of said includes forming the subset of said entities based on said numbers stored in the historical cache.

16. An article of manufacture comprising:

at least one computer usable device having computer readable program code logic tangibly embodied therein to execute instructions in a processing unit for searching for documents in response to a user query, said computer readable program code logic, when executing, performing the following:

receiving, at a computer processor system, a query from a user;

receiving a search scope for the query, the search scope including a set of entities, each of the entities including one or more documents;

forming a subset of said entities based on defined criteria, wherein the subset of said entities includes a number of the entities of said set of entities; and sending said query and said subset of said entities to a search engine to search said subset of said entities;

the search engine searching through said subset of said entities to identify a first group of documents from said subset of said entities, said first group of documents linking to a number of the entities in said subset of the entities;

adding the linked entities to a linked entities set, wherein the linked entities set includes a number of the entities of the subset of said entities;

comparing the number of the entities in the linked entities set to the number of the entities in said subset of said entities; and when the difference between the number of the entities in the linked entities set and the number of the entities in said subset of said entities is less than a defined, linked entities threshold value, adding one of the entities in the set of entities to the subset of the entities; and repeating the searching, adding, comparing, and adding one of the entities in the set of entities to the subset of the entities until the difference between the number of the entities in the linked entities set and the number of the entities in said subset of said entities is not less than the defined, linked entities threshold value.

17. The article of manufacture according to claim 16, said computer readable program code logic, when executing, further performing:

when said number of the linked entities is more than the defined value, forming another subset of the entities and sending said query and said another subset of the entities to the search engine to search said another subset of said entities for further documents.

18. The article of manufacture according to claim 17, said computer readable program code logic, when executing, further performing:

for each of said specified entities, estimating a number of the documents included in said each entity that would be identified in a search through said each entity to answer said query; and the forming a subset of said entities includes forming the subset of said entities based on the estimated number of the documents included in said each entity that would be identified in a search through said each entity to answer said query.

19. The article of manufacture according to claim 18, wherein:

said estimating a number of the documents includes storing in a historical cache results from previous searches through each of the entities, including for each of the entities, storing in the historical cache a number that is the largest number of the documents identified in the each entity during any of the previous searches through the each entity.

20. The article of manufacture according to claim 19, wherein the forming a subset of said includes forming the subset of said entities based on said numbers stored in the historical cache.

* * * * *